United States Patent [19]

Kuroda et al.

[11] Patent Number: 5,265,446
[45] Date of Patent: Nov. 30, 1993

[54] CONTROL APPARATUS FOR WASHING MACHINE

[75] Inventors: Kouichi Kuroda, Gamou; Hajime Suzuki; Masakatsu Morishige, both of Ootsu; Katsuji Oonishi, Uji, all of Japan

[73] Assignee: Sanyo Electric Co., Ltd., Osaka, Japan

[21] Appl. No.: 4,146

[22] Filed: Jan. 13, 1993

[30] Foreign Application Priority Data

Feb. 4, 1992 [JP] Japan .................................. 4-19060

[51] Int. Cl.⁵ ............................................. D06F 33/02
[52] U.S. Cl. ............................................. 68/12.02; 68/12.21
[58] Field of Search ................. 68/12.01, 12.02, 12.03, 68/12.19, 12.21

[56] References Cited

U.S. PATENT DOCUMENTS

| | | | |
|---|---|---|---|
| 5,048,139 | 9/1991 | Matsumi et al. | 68/12.02 |
| 5,083,447 | 1/1902 | Kiuchi et al. | 68/12.02 |
| 5,105,635 | 4/1992 | Kiuchi et al. | 68/12.02 |

FOREIGN PATENT DOCUMENTS

| | | | |
|---|---|---|---|
| 59-141991 | 8/1984 | Japan | 68/12.02 |
| 61-167786 | 1/1986 | Japan | 68/12.02 |
| 61-160000 | 7/1986 | Japan | 68/12.02 |
| 2-280793 | 11/1990 | Japan | 68/12.02 |

Primary Examiner—Frankie L. Stinson
Attorney, Agent, or Firm—Joseph C. Mason, Jr.; Ronald E. Smith

[57] ABSTRACT

The control apparatus of the present invention is used for a washing machine in which a photosensor having a light emitting element and a light receiving element opposite thereto, detects the degree of light transmission in washing water, and in which, based on variations of the degree of light transmission in washing water thus detected, the respective steps of washing, rinsing and draining are controlled. Correction is made such that the photosensor presents a predetermined sensitivity to set a current which flows in the light emitting element, after which a washing operation is started. After drainage, when the next water supply operation is started and the level of water thus supplied reaches a predetermined level within a predetermined period of time, it is judged that washing water used at the previous washing remains in a washing tank. Then, control is made such that no adjustment is made of the sensitivity of the photosensor and a standard current flows in the light emitting element. Thereafter, a washing operation is started. Thus, the control apparatus of the present invention is adapted such that no influence is exerted upon the degree of washing by variations of the characteristics of light emitting elements and light receiving elements.

3 Claims, 5 Drawing Sheets

CONTROL APPARATUS FOR WASHING MACHINE

BACKGROUND OF THE INVENTION

1. Field Of The Invention

The present invention relates to a washing machine for washing clothing or dishes, such as a clothing washer or a dish washer.

2. Description Of The Related Art

As an example of a washing machine of the type above-mentioned, there is known a dish washing and drying machine as disclosed in Japanese Patent Laid-Open Publication No. 60-48724(A)/1985. This dish washing and drying machine has a photosensor for detecting variations of the degree of light transmission in washing water inside of a water supply pipe disposed between a water reservoir at the bottom of a cleaning tank and a water inlet connected to a nozzle pump. The photosensor comprises a light emitting element and a light receiving element. With the use of the fact that the light receiving element changes in the amount of received light dependent on the degree of light transmission in water passing between the light emitting element and the light receiving element, the photosensor is adapted to detect variations of the degree of light transmission in washing water. According to the result of such detection, there is controlled the completion of the washing, rinsing, draining and drying steps.

However, commercially available light emitting elements are not constant in characteristics, so that they differ in light emitting output from one another. Likewise, commercially available light receiving elements are not constant in characteristics, so that the output voltages thereof vary with the amounts of received light.

This involves the likelihood that, even though different dishes which have been contaminated to the same extent, are washed with the use of the same drive circuit, the evaluation on the degree of light transmission in washing water varies with the combinations of light emitting/receiving elements. This may prevent the same washing effect from being produced.

In a system of controlling the steps according to the degree of light transmission as conventionally done, the degree of light transmission in washing water which is not contaminated, is generally measured to determine a reference value, and the degree of contamination of washing water is judged based on the difference between the reference value and an actually measured value. However, when a great amount of washing water which has been used at the previous washing, remains in the washing tank, water supplied into the washing tank becomes contaminated. If the degree of light transmission is measured to determine a reference value in such a situation, washing water which is actually dirty, might be erroneously judged as clean at the time of washing or rinsing, thus preventing a sufficient washing from being carried out.

In this connection, when the user manages to stop the operation to remove the washing water which has been used at the previous washing and which remains in the washing tank, and clean water is then supplied into the washing tank, the degree of light transmission can be accurately evaluated. However, this requires the user to remove the remaining water, thus lowering the maneuverability.

SUMMARY OF THE INVENTION

It is an object of the present invention to provide a control apparatus for washing machine capable of automatically correcting variations of the characteristics of light emitting elements and light receiving elements.

It is another object of the present invention to provide a control apparatus for washing machine which does not considerably lower the washing capability even though washing water used at the previous washing remains in the washing tank.

To achieve the object above-mentioned, the present invention provides a control apparatus for washing machine in which a photosensor having a light emitting element and a light receiving element opposite thereto, detects the degree of light transmission in washing water, and in which, based on variations of the degree of light transmission in washing water thus detected, the respective steps of washing, rinsing and draining are controlled, and is characterized in that, in a predetermined case, it is judged whether or not the light receiving element detects a predetermined amount of received light, and when it is judged that the light receiving element does not detect the predetermined amount of received light, a current flowing in the light emitting element is controlled such that the light receiving element detects the predetermined amount of received light.

According to the present invention, the sensitivity of each photosensor is adjusted to prevent the degree of washing from varying, even though the characteristics of light emitting elements or light receiving elements vary from one to another.

To achieve the another object above-mentioned, the present invention is arranged in the following manner. The photosensor judges whether or not the level of water in the washing tank reaches a predetermined level within a predetermined period of time after a water supply operation starts. When the water level does not reach the predetermined level within the predetermined period of time after the start of the water supply operation, it is judged that the water in the washing tank is clean. Accordingly, a current flowing in the light emitting element is controlled such that the light receiving element detects a predetermined amount of received light. On the other hand, when the water level reaches the predetermined level within the predetermined period of time after the water supply operation starts, it is judged that water used at the previous washing remains in the washing tank. Then, control is made such that a current which has been previously stored, flows in the light emitting element without correction made of the photosensor or without use of the result of correction of the photosensor when such a correction has been already made.

According to the present invention, whether or not washing water used at the previous washing remains in the washing tank is judged by a period of time during which the level of water reaches a predetermined water level after the water supply operation starts. Provision is made such that, when washing water remains in the washing tank, the sensitivity is not adjusted and a predetermined standard current flows. Thus, there is no possibility of the reference value being determined based on the degree of light transmission in dirty water. It is therefore possible to perform a washing operation without the washing performance deteriorated.

These and other objects of the present invention will be apparent from the following description made with reference to the attached drawings.

DETAILED DESCRIPTION OF THE EMBODIMENTS

Figure 1:
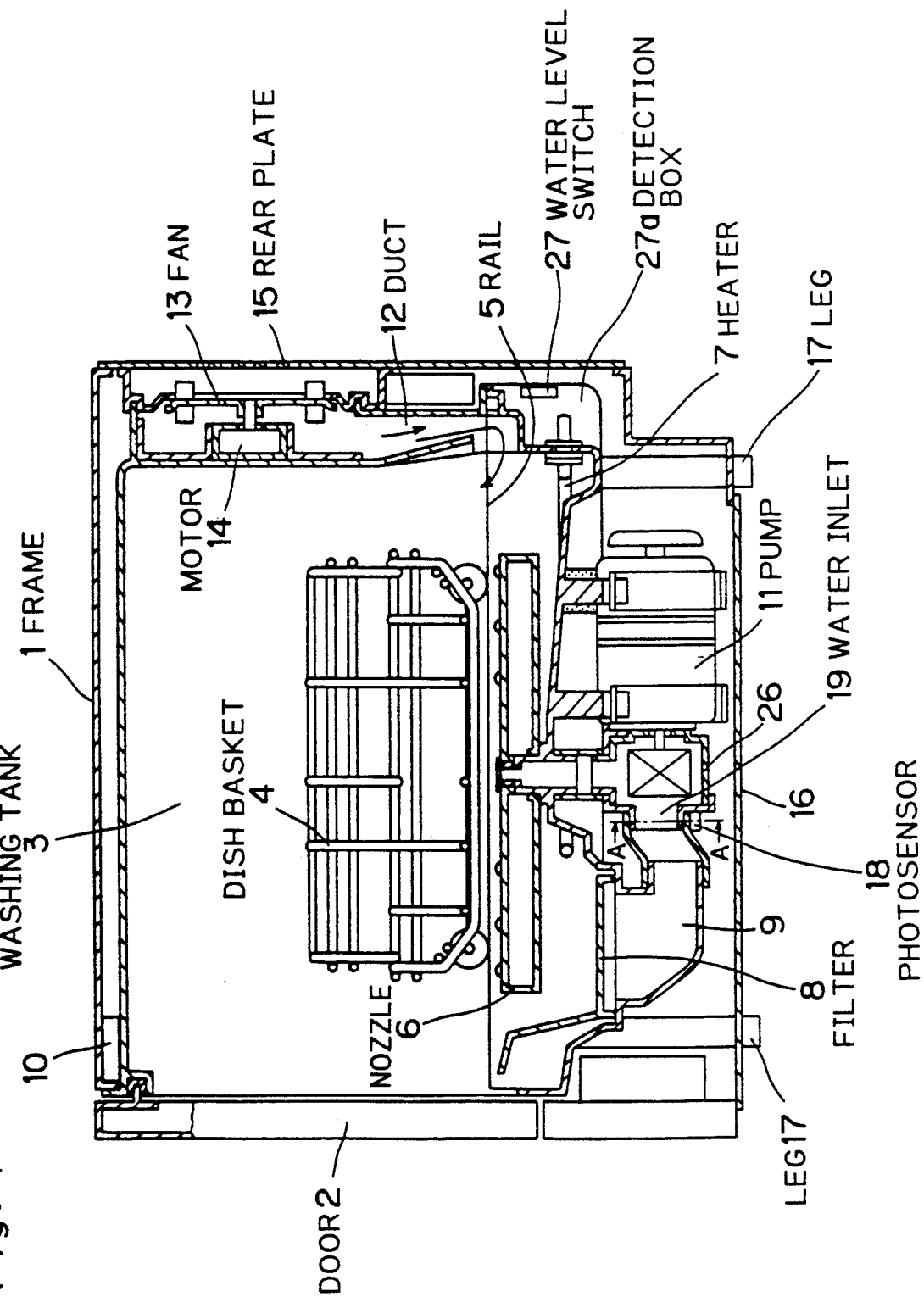
FIG. 1 is a section view of a dish washing and drying machine in accordance with an embodiment of the present invention.

FIG. 1 shows a dish washing and drying machine. In FIG. 1, a dish washing and drying machine has an outer frame including a metallic frame 1 which covers the top and lateral sides of the machine body, a rear plate 15 which closes the rear side of the machine body, and a bottom plate 16 which closes the bottom side of the machine body. The machine is provided at the front side thereof with an openable door 2. The bottom plate 16 is provided in the vicinity of the four corners thereof with legs 17.

A dish basket 4 slidable back and forth with the door 2 opened, is put in a washing tank 3 disposed in the metallic frame 1. The dish basket 4 is slidable along rails 5 disposed at intermediate stages of the washing tank 3.

The washing tank 3 is provided at the bottom thereof with a rotatable long washing nozzle 6 and an annular sheathed heater 7. A removable garbage filter 8 is put in a concave 9 in the bottom of the washing tank 3 at the front side thereof. A door switch 10 is disposed for detecting whether the door 2 is opened or closed.

Formed in the washing nozzle 6 are propelling injection holes (not shown) for jetting washing water in transverse directions. The injection holes are formed in the left and right hands of one end of the washing nozzle 6. There are also disposed valves (not shown) for alternately opening and closing the two injection holes. By jetting washing water from either injection hole, the washing nozzle 6 can be rotated forwardly or reversely.

When a washing and draining pump (hereinafter referred to as pump) 11 is forwardly rotated, washing water is supplied to the washing nozzle 6. When the pump 11 is reversely rotated, the washing water inside of the washing tank 3 is drained through a drainpipe (not shown).

Provision is made such that, when the pump 11 is operated as driven—stopped—driven at the time when the pump 11 is forwardly rotated, the valves in the washing nozzle 6 are operated to change the injection hole to be opened, thus inverting the rotation direction of the washing nozzle 6.

A circulating duct 12 communicating with the washing tank 3 forms a closed loop therewith. This circulating duct 12 intercepts the outside air with respect to the air in the tank to carry out heat exchange with the tank air, and also eliminates the humidity in the tank air. A both-side fan 13 is provided at both sides thereof with blades. One surfaces of the blades come in contact with the outside air, while the other surfaces of the blades come in contact with the tank air. The both-side fan 13 is rotated by a motor 14 to forcibly circulate the tank air in the circulating duct 12.

Figure 2:
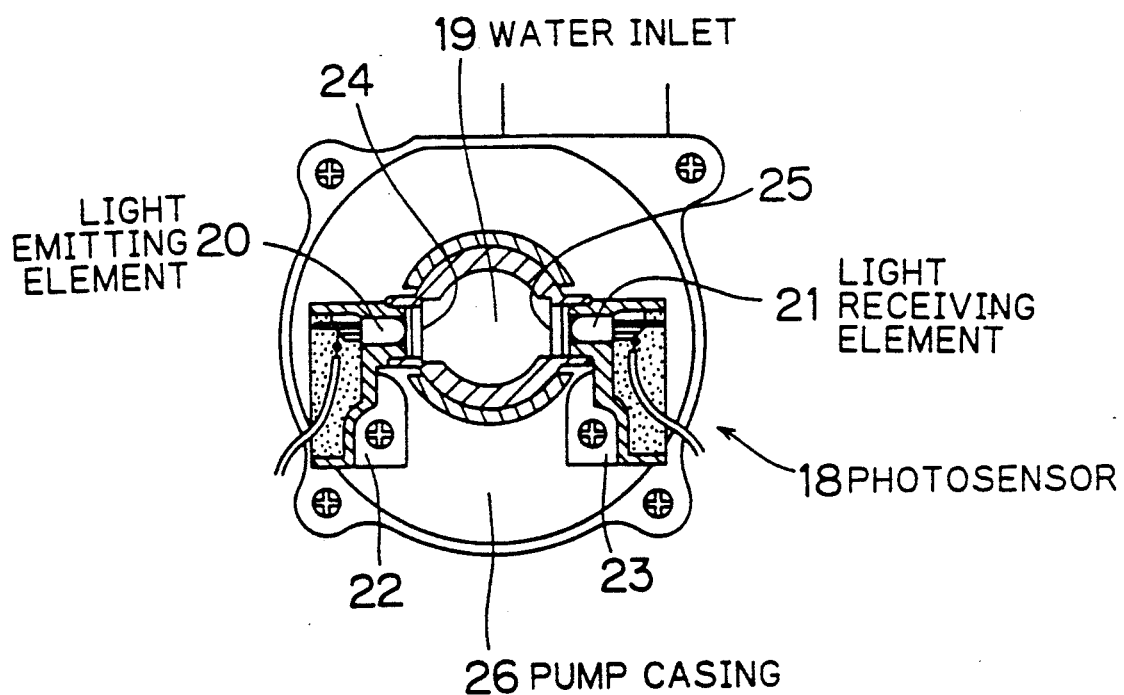
FIG. 2 is a section view taken along the line A—A in FIG. 1.

A photosensor 18 is disposed at a water inlet 19 for sucking the washing water in the washing tank 3 by the pump 11. As shown in FIG. 2, the photosensor 18 is attached to a pump casing 26 by screws, and includes a light-emitting-element case 22 housing a light emitting element 20, and a light-receiving-element case 23 housing a light receiving element 21. A light emitting surface of the light emitting element 20 and a light receiving surface of the light receiving element 21 are disposed opposite to each other on the outer periphery of the water inlet 19 of the pump 11.

As shown in FIG. 1, a detection box 27a communicating with the washing tank 3 houses a water level switch 27 which serves as a water level detecting means adapted to supply an ON signal when washing water supplied into the washing tank 3 reaches a predetermined water level. The water level switch 27 incorporates a float for example. With the rise in water level, the float comes up to the water surface. Provision is made such that, when the float reaches a predetermined water level, a limit switch is interlockingly turned on.

Figure 3:
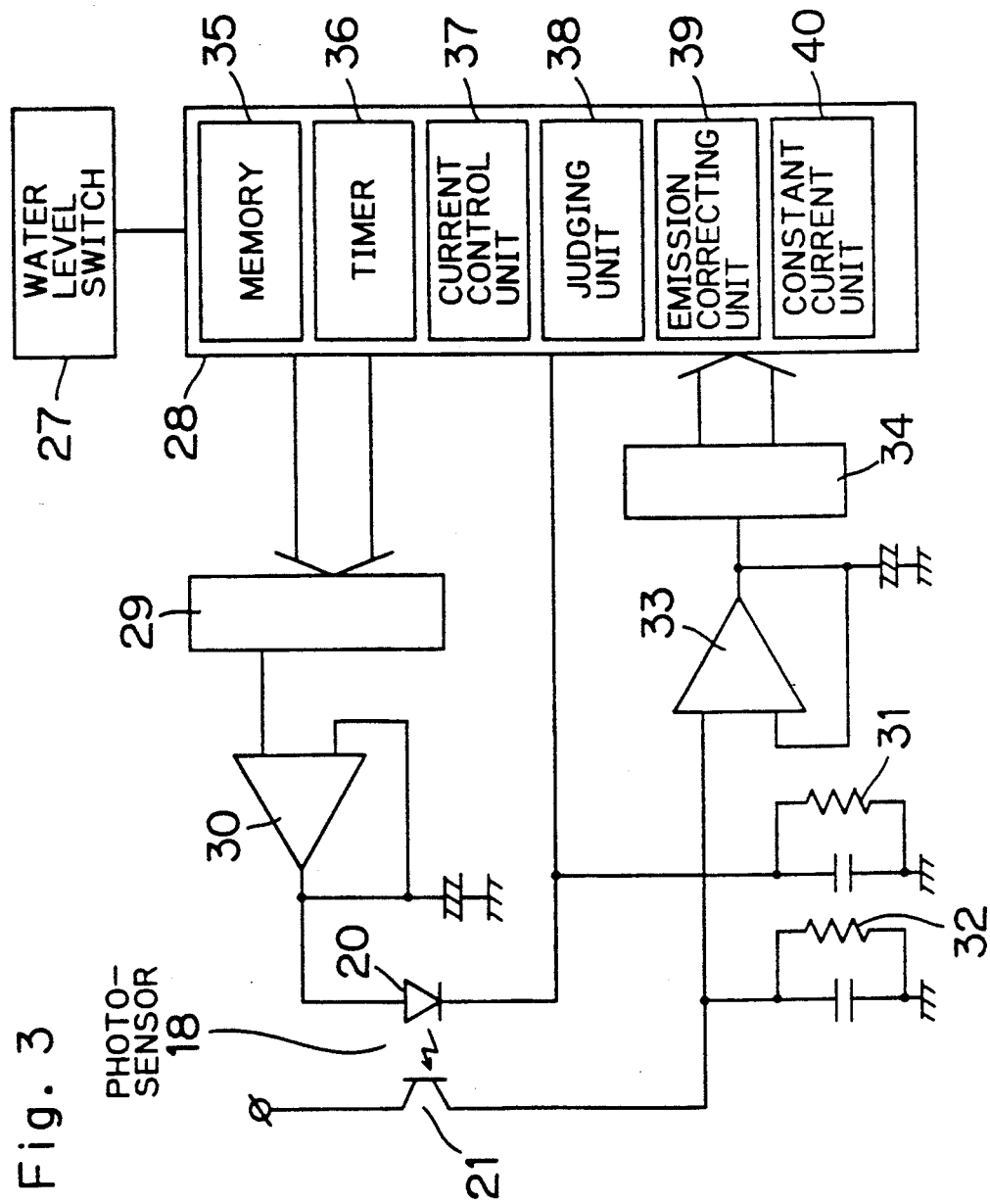
FIG. 3 is a control block diagram of the dish washing and drying machine in accordance with the embodiment of the present invention.

FIG. 3 shows a control block diagram of the photosensor 18. In FIG. 3, parts designated by like reference numerals used in connection with the description above-mentioned, present the same functions and are therefore not described here.

The photosensor 18 is controlled by a microcomputer 28 serving as a control unit which controls the operation, a D/A converter 29 formed by a RADA circuit for example for converting a digital signal from the microcomputer 28 into an analog signal, a buffer circuit 30 formed by an operational amplifier for supplying an electric current according to the level as converted by the D/A converter 29, a limiting resistance 31 for limiting a current to be supplied to the light emitting element 20, a limiting resistance 32 for limiting a current to be supplied to the light receiving element 21, a buffer circuit 33 for stabilizing the signal of the light receiving element 21, an A/D converter 34 for converting an output of the buffer circuit 33 into a digital signal, and the like.

The microcomputer 28 includes: a memory 35 which stores a reference current value which is to be supplied to the light emitting element 20; a timer 36 for counting a water supply period of time; a current control unit 37 arranged such that a current having a value set by a light emission correcting unit 39 or a constant current unit 40 to be discussed later, flows in the light emitting element 20; a judging unit 38 for judging whether or not that amount of light of the light emitting element 20 which is received by the light receiving element 21, is a predetermined amount of received light; the light emission correcting unit 39 for setting the value of a current which flows in the light emitting element 20 such that a predetermined amount of received light is detected by the judging unit 38; and the constant current unit 40 for setting the current control unit 37 such that a standard current stored in the memory 35 flows in the light emitting element 20.

Figure 4:
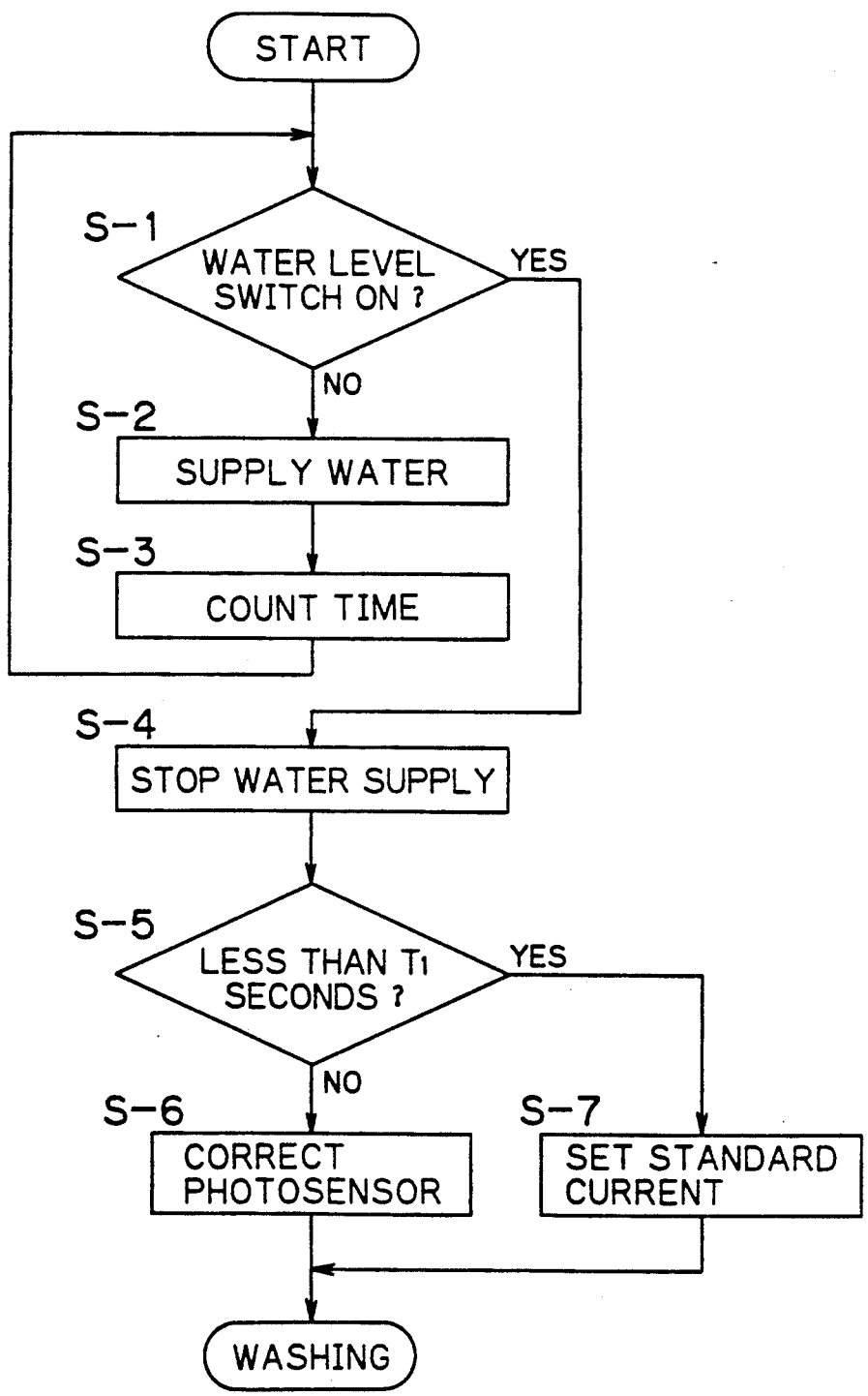
FIG. 4 is an operational flow chart of the dish washing and drying machine in accordance with the embodiment of the present invention.

In the following, the operation of the arrangement above-mentioned will be discussed with reference to a flow chart in FIG. 4.

The water level switch 27 judges whether or not the level of washing water in the washing tank 3 reaches a predetermined water level (S-1). When the level of washing water does not reach the predetermined water level, water is supplied (S-2). The water supply period of time is counted by the timer 36 (S-3). When the level of washing water reaches the predetermined water level, the water supply operation is stopped (S-4).

When it is judged that the water supply period of time as counted at the step S-3 is not less than $T_1$ seconds (for example 15 seconds) (S-5), it is judged that there is no water remaining in the washing tank 3 or that even though there is water remaining in the washing tank 3, the amount thereof is too small to exert an influence upon the degree of light transmission. Accordingly, an operation of correcting the photosensor 18 is carried out (S-6). The $T_1$ seconds is a predetermined period of time shorter than a period of time $T_0$ (for example 30 seconds) during which the washing tank 3 which is empty, is filled with water up to the predetermined water level.

The correcting operation at the step S-6 is carried out in the following manner. As shown in FIG. 3, the microcomputer 28 is operated such that the standard current stored in the memory 35 flows in the light emitting element 20 through the D/A converter 29 and the buffer circuit 30. At this time, the amount of light received by the light receiving element 21 is detected by the microcomputer 28 through the A/D converter 34, and the judging unit 38 judges whether or not the amount of received light thus detected reaches a predetermined amount of received light.

When the judging unit 38 judges that the amount of received light is too much, the light emission correcting unit 39 controls the current control unit 37 to reduce the current which flows in the light emitting element 20. On the other hand, when the judging unit 38 judges that the amount of received light is too small, adjustment is so made as to increase the current which flows in the light emitting element 20, until the amount of received light reaches the predetermined level. Such adjustment is generally called a photosensor sensitivity adjustment.

When the sensitivity of the photosensor is adjusted, the value of this current which flows in the light emitting element 20 is set to the current control unit 37, as the current value with which the degree of light transmission is to be detected. Thereafter, a washing operation starts.

When the water supply period of time is not greater than $T_1$ seconds at the step S-5; that is, when the predetermined water level is reached immediately after the water supply operation starts at the step S-5, it is judged that washing water used at the previous washing remains in the washing tank 3. Then, the constant current unit 40 does not adjust the sensitivity of the photosensor 18, and the standard current stored in the memory 35 is set to the current control unit 37, as the current value with which the degree of light transmission is to be detected (S-7). Thereafter, a washing operation is executed.

When washing water used at the previous washing remains in the washing tank 3 in an amount greater than a predetermined amount, water in the tank after the water supply operation starts, is contaminated. When the sensitivity adjustment is carried out with the water thus contaminated, it is not possible to detect the accurate amount of light of the light emitting element 20 which is received by the light receiving element 21. This involves the likelihood that no accurate sensitivity adjustment can be made to remarkably lower the precision of the photosensor 18.

Even though there is water remaining in the washing tank 3, the accuracy of the photosensor sensitivity can be improved if the user manages to stop the operation to remove the remaining water. In this case, however, the user is absolutely required to carry out such a water removal, thus lowering the maneuverability of the machine. In this connection, the dish washing and drying machine of the present invention is arranged such that a standard current presenting no great difference from the sensitivity to be generally used, is previously stored in the memory 35, and that the current thus stored in the memory 35 flows in the light emitting element 20 when it is judged at the step S-5 that there is water remaining in the washing tank 3. This restrains the sensitivity of the photosensor from being deteriorated without the maneuverability lowered.

In the embodiment above-mentioned, the sensitivity adjustment of the photosensor 18 is carried out after water is supplied into the washing tank 3. However, the present invention is not limited to such an arrangement. That is, the sensitivity of the photosensor 18 may be adjusted when the water level prior to water supply is located in a position lower than the level at which the photosensor 18 is disposed. Exactly speaking, by such an adjustment, the degree of light transmission in water is not checked but the degree of light transmission in air is checked. However, this does not interfere with the subsequent processing since the degree of light transmission in clean water is not considerably different from the degree of light transmission in air.

Figure 5:
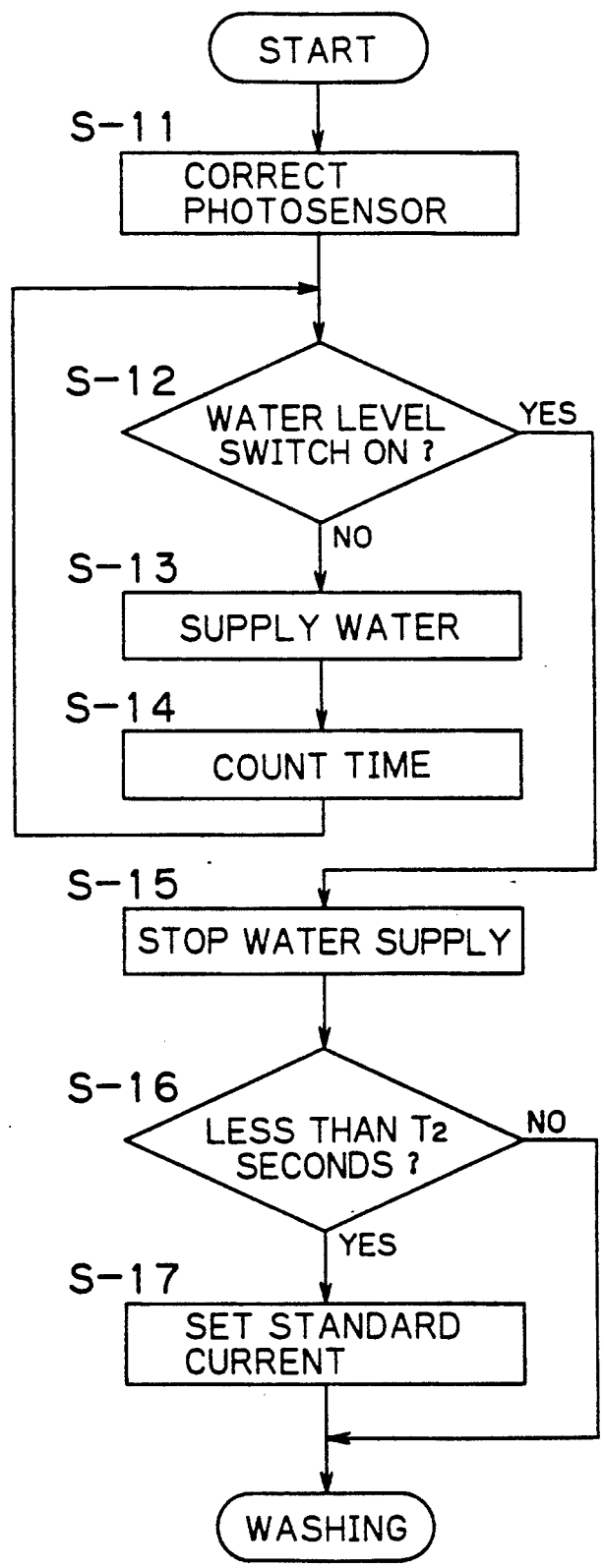
FIG. 5 is an operational flow chart of the dish washing and drying machine in accordance with another embodiment of the present invention.

FIG. 5 shows an operational flow chart of the dish washing and drying machine according to another embodiment of the present invention. The following description will discuss the operation of the machine along the flow chart.

Prior to the water supply operation, the sensitivity of the photosensor 18 is first adjusted (S-11), and water is then supplied (S-12 to S-14). When the washing water used at the previous washing remains above the level at which the photosensor 18 is disposed, an accurate sensitivity adjustment cannot be made. In this connection, there is previously checked a water supply period of time $T_2$ (for example 20 seconds) during which the water level reaches a predetermined level from the level at which the photosensor 18 is disposed. It is then judged whether or not a period of time during which the water level actually reaches the predetermined level, is longer than the period of time $T_2$ (S-16). When this period of time is longer than $T_2$, it is judged that, at the time of sensitivity adjustment, there is no remaining washing water used at the previous washing, and the result of sensitivity adjustment can be used as it is. When this period of time is shorter than $T_2$, it is judged that there is remaining washing water used at the previous washing. Then, the constant current unit 40 cancels the result of sensitivity adjustment of the photosensor 18 and the standard current stored in the memory 35 is set to the current control unit 37, as the current value with which the degree of light transmission is to be detected (S-17).

We claim:

1. A control apparatus for washing machine in which a photosensor having a light emitting element and a light receiving element opposite thereto, detects the degree of light transmission in washing water, and in which, based on variations of the degree of light transmission in washing water thus detected, the respective steps of washing, rinsing and draining are controlled, said control apparatus for washing machine comprising:

water level detecting means for judging whether or not the level of water in a washing tank reaches a predetermined water level;

means for judging whether or not said water level detecting means supplies an output within a predetermined period of time after a water supply operation starts;

memory means which stores a standard current value of said light emitting element;

light emission correcting means for judging whether or not said light receiving element detects a predetermined amount of received light, and for controlling a current flowing in said light emitting element such that said light receiving element detects said predetermined amount of received light, when said light emission correcting means has judged that said light receiving element did not detect said predetermined amount of received light; and constant current means adapted such that, when said water level detecting means does not supply an output within a predetermined period of time after a water supply operation starts, the result of correction by said light emission correcting means is employed, and that, when said water level detecting means supplies an output within said predetermined period of time after the water supply operation starts, said standard current stored in said memory means flows in said light emitting element without correction made by said light emission correcting means or without use of the result of correction by said light emission correcting means.

2. A control apparatus for washing machine according to claim 1, wherein the predetermined period of time is a predetermined period of time $T_1$ shorter than a period of time $T_0$ during which the washing tank which is empty, is filled with water up to a predetermined water level.

3. A control apparatus for washing machine according to claim 1, wherein the predetermined period of time is a period of time $T_2$ during which, with the water level located in a position where the photosensor is disposed, water is supplied until the water level reaches a predetermined level.

* * * * *